United States Patent
Baer

(10) Patent No.: US 7,900,142 B2
(45) Date of Patent: Mar. 1, 2011

(54) SELECTIVE UNDO OF EDITING OPERATIONS PERFORMED ON DATA OBJECTS

(75) Inventor: Peter P. Baer, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/623,234

(22) Filed: Jan. 15, 2007

(65) Prior Publication Data

US 2008/0172607 A1    Jul. 17, 2008

(51) Int. Cl.
*G06F 17/24* (2006.01)
*G06F 17/00* (2006.01)

(52) U.S. Cl. ........... 715/255; 715/209; 715/234; 715/769; 707/639

(58) Field of Classification Search .......... 715/205, 715/226, 229, 234, 200–202, 204, 209, 210, 715/231, 243, 253–267, 273, 277, 700, 713, 715/714, 724, 730, 731, 760–762, 769, 770, 715/858, 861; 707/601, 602, 608, 609, 639, 707/641, 649, 658, 668, 679, 687, 695, 705, 707/706, 729, 731, 768, 790, 803, 805, 999.001, 707/999.2, 999.202, 999.203
See application file for complete search history.

(56) References Cited

U.S. PATENT DOCUMENTS

| | | | |
|---|---|---|---|
| 5,479,601 A | 12/1995 | Matheny et al. | |
| 5,604,853 A * | 2/1997 | Nagashima | 715/210 |
| 5,659,747 A * | 8/1997 | Nakajima | 713/1 |
| 5,757,372 A * | 5/1998 | Krause et al. | 715/840 |
| 5,940,847 A | 8/1999 | Fein et al. | |
| 6,185,591 B1 * | 2/2001 | Baker et al. | 715/210 |
| 6,192,378 B1 * | 2/2001 | Abrams et al. | 707/999.204 |
| 6,523,134 B2 | 2/2003 | Korenshtein | |
| 6,527,812 B1 | 3/2003 | Bradstreet | |
| 6,618,851 B1 * | 9/2003 | Zundel et al. | 717/103 |
| 7,003,695 B2 | 2/2006 | Li | |
| 7,062,497 B2 | 6/2006 | Hamburg et al. | |
| 7,139,887 B2 * | 11/2006 | Colgrove et al. | 711/162 |
| 7,203,868 B1 * | 4/2007 | Evoy | 714/39 |
| 7,237,080 B2 * | 6/2007 | Green et al. | 711/162 |
| 2003/0208500 A1 | 11/2003 | Daynes et al. | |
| 2004/0083263 A1 | 4/2004 | Richardson et al. | |
| 2004/0205663 A1 * | 10/2004 | Mohamed | 715/530 |

(Continued)

OTHER PUBLICATIONS

Ressel et al., *Reducing the Problems of Group Undo*, Copyright ACM 1999, pp. 131-139, http://www.welie.com/eelke/literature/p131-ressel.pdf.

(Continued)

*Primary Examiner*—Maikhanh Nguyen
(74) *Attorney, Agent, or Firm*—Merchant & Gould P.C.

(57) ABSTRACT

An undo process performed on a data object includes selecting a stored prior state of the data object; comparing the stored prior state with the current state of the data object to determine differences between the stored prior state and the current state of the data object other than the effect of the undesired editing operation; and applying the differences to the stored prior state of the data object to obtain a new state of the data object. Each prior state of the data object corresponds to an effect of one of previously performed editing operations on the data object.

7 Claims, 12 Drawing Sheets

U.S. PATENT DOCUMENTS

2006/0129884 A1* 6/2006 Clark .......................... 714/15
2007/0088729 A1* 4/2007 Baca et al. .................. 707/101

OTHER PUBLICATIONS

Sun, Chengzheng, *Undo Any Operation at Any Time in Group Editors*, pp. 191-200, Proceedings of CSCW 2000, Philadelphia, PA, ACM Press, http://www.welie.com/eelke/literature/p191-sun.pdf(2000).

Von Weitershausen, Philipp, *Simplify undo model*, pp. 1-4, Nov. 1, 2006, http://www.zope.org/Wikis/DevSiteProjects/ComponentArchitecture/SimplifyUndoModel.

* cited by examiner

SELECTIVE UNDO OF EDITING OPERATIONS PERFORMED ON DATA OBJECTS

BACKGROUND

There are many interactive data-editing software applications developed for editing a wide variety of data objects, such as text documents, business charts, engineering drawings, digital pictures, computer graphics, etc. With commonly used data-editing applications, a user modifies a data object by interactively applying consecutive editing operations to the data object. For example, the user of a word processing program edits a text document by typing and deleting words, cutting, pasting, reformatting, etc., and the user of a digital painting program may modify a picture by applying multiple strokes of various digital paintbrushes.

Regardless of the types of data object and interactive editing operations involved, the user, from time to time, decides the effects of one or more editing steps are not desirable and opts to remove the changes made by those editing steps. To that end, most interactive data-editing applications support an "undo" function that restores the data object to a state prior to the undesired edits.

A widely used approach to implement the undo function is the "serialized" approach. Under this serialized approach, to undo the last editing step, the inverse of the last editing command is applied to the data object to return the data object to its previous state. The approach is serial in that editing operations only can be undone in reverse of the order in which they were originally performed. For example, this serialized approach is commonly used in word processing programs to undo editing operations.

To enable the undoing of editing operations, the editing commands (e.g., insertion, deletion, cutting, pasting, formatting, etc.) and the corresponding changes (such as the inserted or deleted portions) may be saved in a buffer. Each time the user selects the undo function, the inverse of the last editing operation is applied to the document to recreate its prior state. By way of example, a deletion performed on a document can be undone by reinserting the deleted portion into the document. By selecting the undo function multiple times, the user can undo multiple consecutive editing steps applied to a document.

In another serialized approach, when a user inputs a command to edit a data object, the application takes a first snapshot (e.g., a copy) of the content of the data object, performs the editing operation, and takes a second snapshot of the content of the data object. A predetermined number of snapshots can be taken showing the data object in different states. In general, the undo operation is implemented by reloading a previous snapshot of the data object.

Both of these approaches can be disadvantageous in particular situations. For example, a user only can undo editing operations in a serial fashion and cannot select specific operations to undo without undoing intervening operations as well. In addition, in shared environments in which multiple users edit the same data object, a first user could cancel the effects of a second user's work unintentionally. If the shared data object is associated only with a single record of prior states, then a first user attempting to undo the first user's editing operation could inadvertently undo an editing operation performed by a second user after the first user's editing operation and before issuance of the undo request.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

An undo process performed on a data object includes selecting a stored prior state of the data object and comparing the stored prior state with the current state of the data object to determine differences between the stored prior state and the current state of the data object other than the effect of the undesired editing operation. Applying the differences to the stored prior state of the data object produces a new state of the data object. Each prior state of the data object corresponds to an effect of one of previously performed editing operations on the data object.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

In the following detailed description, references are made to the accompanying drawings that form a part hereof, and in which are shown by way of illustrations specific embodiments or examples. While the disclosure will be described in the general context of program modules that execute in conjunction with an application program that runs on an operating system on a computer system, those skilled in the art will recognize that the disclosure also may be implemented in combination with other program modules. The embodiments described herein may be combined and other embodiments may be utilized without departing from the spirit or scope of the present disclosure. The following detailed description is therefore not to be taken in a limiting sense, and the scope of the invention is defined by the appended claims and their equivalents.

Figure 1:
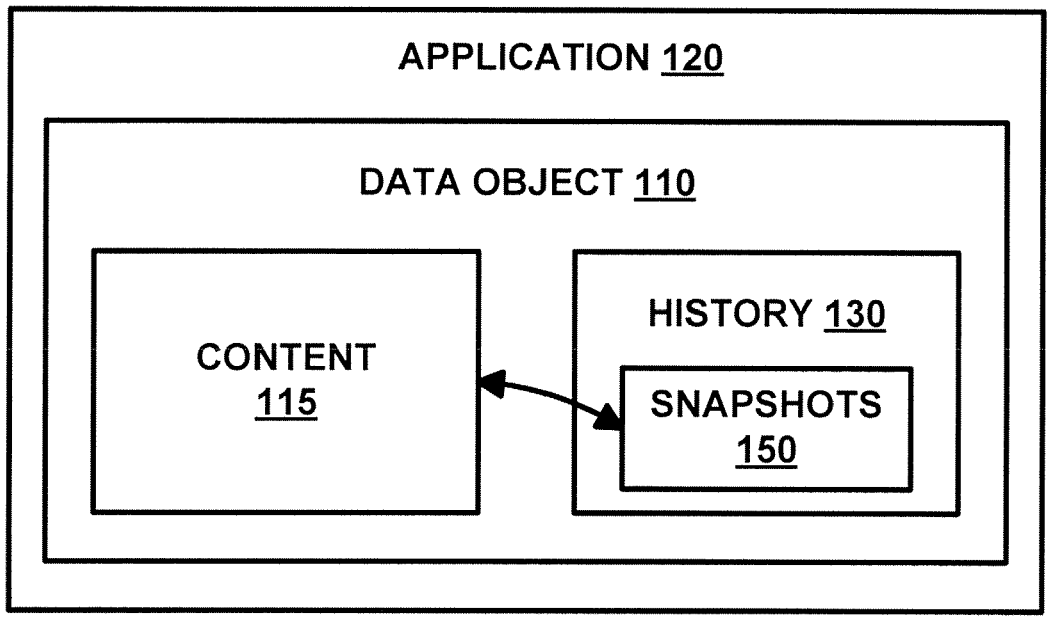
FIG. 1 is a block diagram illustrating an exemplary environment for practicing embodiments of the present disclosure.

Embodiments of the present disclosure enable a user to undo one or more editing operations performed on a data object. FIG. 1 is a block diagram illustrating an exemplary environment 100 for practicing embodiments of the present disclosure. A data object 110 generated by an application 120 includes content 115 and a history 130 (i.e., often referred to as an undo stack). The content 115 includes the text, graphics, and other data structures visible to the user. The history 130 includes a record of previous states of the content 115 (i.e., prior versions of the data object 110). The history 130 retains sufficient information to enable restoration of the document from a current state to a prior state.

In general, the history 130 includes one or more snapshots 150 taken of the data objects 110 at different points in time. In general, a snapshot 150 is a fixed record of a state of the data object 110 at a given point in time. The snapshot 150 can include a copy of the data object 110 taken at a particular point in time or sufficient information to recreate the data object. In the example shown, the history 130 contains less than one-hundred snapshots 150 of the data object 110, although more or fewer snapshots 150 can be stored.

In some embodiments, a snapshot 150 is taken of the data object 110 before execution of an editing operation. In other embodiments, a snapshot 150 is taken of the data object 110 after execution of an editing operation. In still other embodiments, snapshots 150 are taken of the data object 110 both before and after execution of each editing operation.

In an embodiment, the exemplary environment 100 shown in FIG. 1 is a word processor environment, the application 120 is a word processor application, and the data object 110 is a word processor document. The word processor document 110 includes content 115 and an undo stack or document history 130. The document history 130 is used by the word processor application 120 to store different states of the word processor documents 110 resulting from editorial revisions made to the documents 110. For example, the document history 130 can store changes made to the text, style, and/or formatting of the content 115 of the word processor document 110.

In another embodiment, the application 120 is a graphic editing application and the data object 110 is an image file. The state of the image file 110 being edited at a given time is typically defined by the colors of the pixels in the image. The color information may be in a commonly used color format, such as the well-known RGBa format where R, C, B, and a stand for red, green, blue, and transparency, respectively. The state of the image at a given time is stored by storing the color information of the pixels in the memory.

It will be appreciated that it may not be necessary to store the color of every pixel of the image file 110 in each snapshot 150 to retain sufficient information to restore the image file 110 to the state shown in the snapshot 150. For example, a digital picture can be divided into a plurality of tiles, each tile being 64 pixels high and 64 pixels wide. For a given state, only those tiles that are touched by one or more strokes need to be stored in the memory.

The principles disclosed herein also are applicable to other application programs capable of processing various forms of content (e.g. text, images, pictures, etc.), such as spreadsheet application programs, database application programs, presentation application programs, drawing or computer-aided drafting application programs, and others. It will be appreciated that the disclosure is not intended to be limited by any particular embodiments or examples described herein. For example, the word processor environment 100 may include a plurality of word processor documents 110 and document histories 130.

Figure 2:
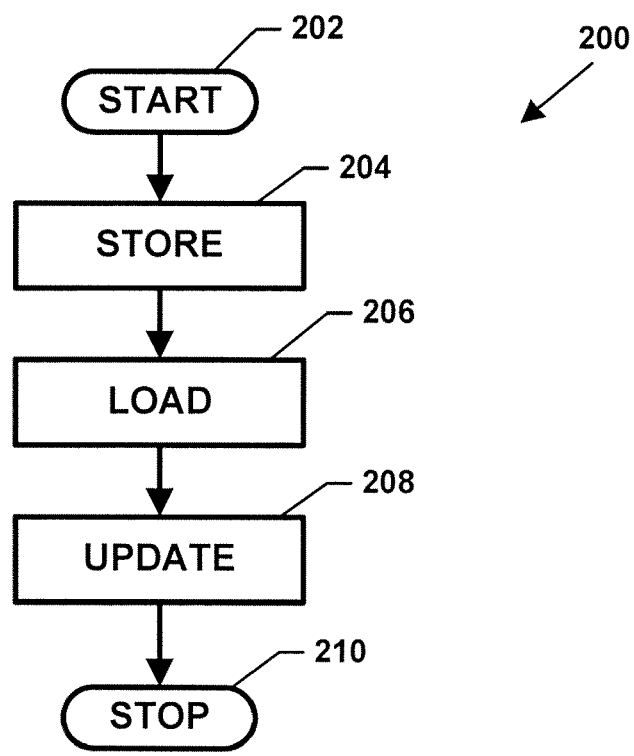
FIG. 2 illustrates a flowchart depicting an editing process performed in accordance with the principles of the present disclosure.

FIG. 2 is a flowchart depicting an editing process 200 performed in accordance with the principles of the present disclosure. The editing process 200 begins at a start module 202 and proceeds to a store operation 204. Store operation 204 generates snapshots 150 of the data object 110 before and/or after execution of each editing operation requested by a user.

When the user requests a particular editing operation be undone, the editing process 200 proceeds to a restore operation 206. The restore operation 206 determines which snapshot 150 in the history 130 represents the state of the data object prior to execution of the editing operation to be undone. The restore operation 206 also returns the data object 110 to the state indicated by the snapshot 150.

An update operation 208 determines how the data object 110 has changed since the execution of the editing operation to be undone. For example, in an embodiment that will be described in greater detail herein, the update operation 208 performs a three-way merge among a state of the data object 110 prior to the operation to be undone, a state of the data object 110 subsequent to the operation to be undone, and the current state of the data object 110. The update operation 208 applies these changes to the restored data object 110 to produce a new state of the data object 110 reflecting the changes made subsequent to the undone editing operation but not reflecting the original effects of the editing operation. The editing process 200 completes and ends at stop module 210.

In general, an undo operation executed in accordance with the principles of the present disclosure typically does not determine what editing operations were executed by the user to produce a given state of a data object. Rather, the undo operation determines differences between the current state of the data object and a prior state of the data object and generates new editing operations to produce these differences.

It will be appreciated that what constitutes an editing operation depends on the nature of the editing process and design choices made by software developers. For instance, in a word processing application, an editing operation may include the entering of text in a given period of time or the deletion of a selected text block. In a digital painting program, it may be convenient to treat each painting stroke as one editing operation. Alternatively, each editing operation may include only a fraction of a stroke to provide finer granularity of the undo operation.

Figure 3:
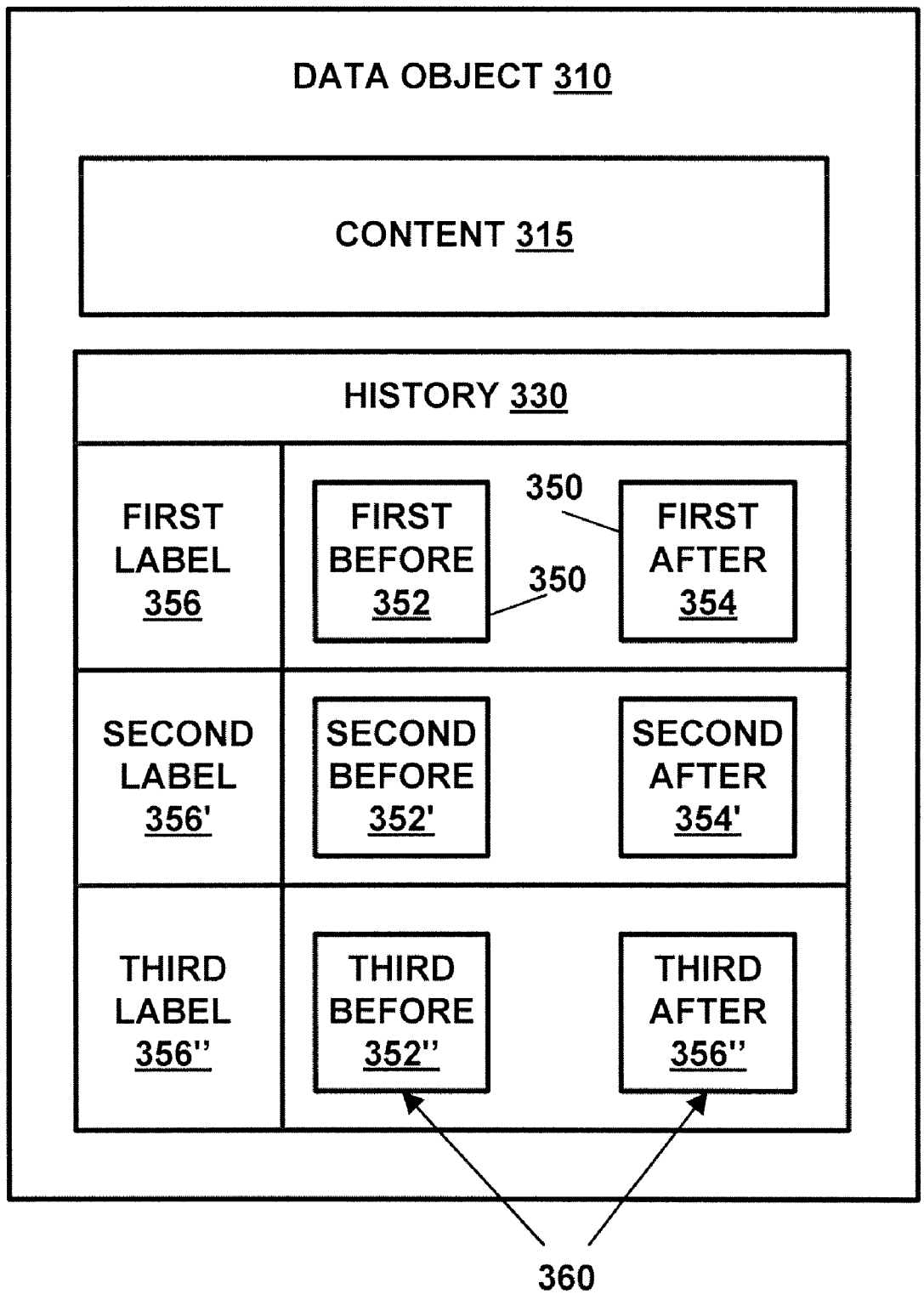
FIG. 3 is a block diagram of a data object including a content and history storing snapshot pairs.
Figure 4:
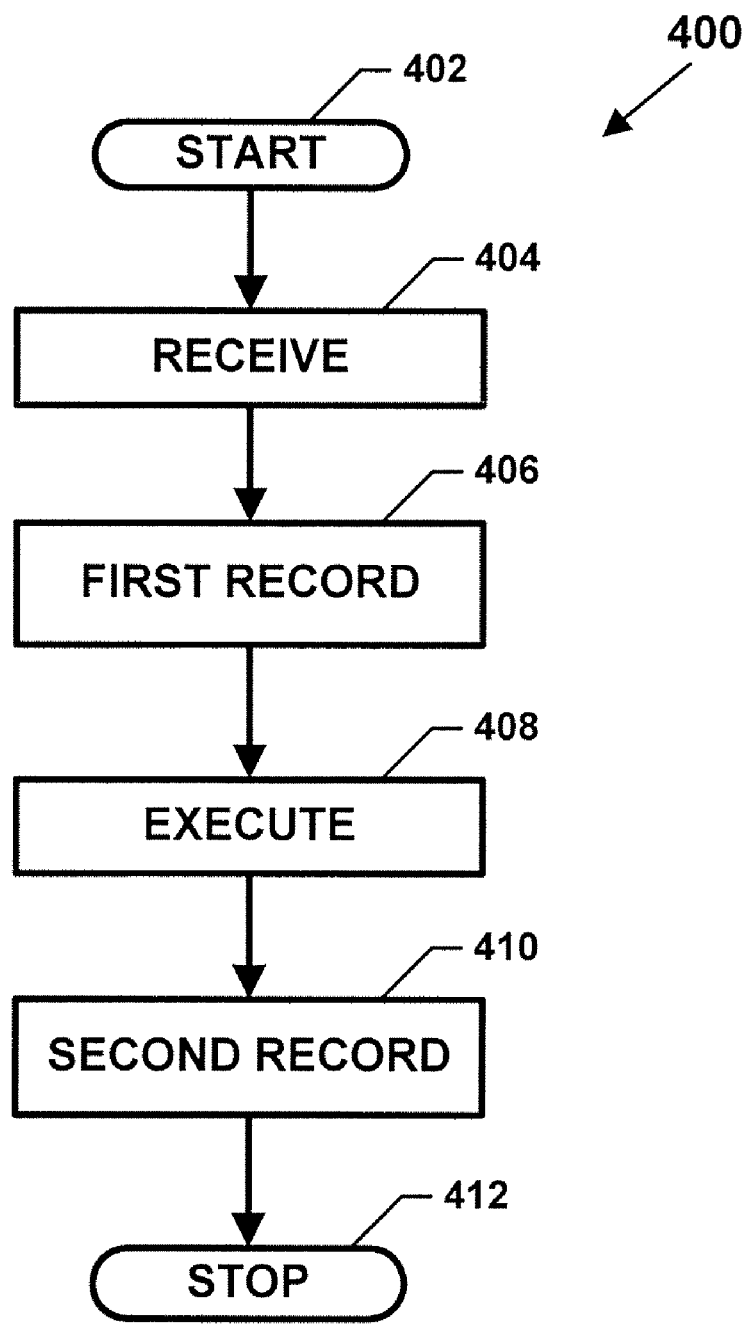
FIG. 4 is a flowchart depicting an exemplary log process for storing prior versions of a data object in accordance with the principles of the present disclosure.

Referring now to FIGS. 3 and 4, the history or undo stack of a data object will be described in more detail. Broadly, during an editing process for editing content 315 of a data object 310, a plurality of versions of the content 315 are stored in system memory in a history 330, often referred to as an "undo stack." The stored versions can include state of content 315 prior to and after editing operations are performed.

In an embodiment, pairs 360 of snapshots 350 of a data object 310 are stored in the history 330 of the data object 310. Each pair 360 of snapshots 350 includes a first snapshot 352 taken before execution of an editing operation and a second snapshot 354 taken after execution of an editing operation. Each pair 360 of snapshots 350 is associated with a label 356 indicating a difference between the first and second snapshot 352, 354. For example, if the first snapshot 352 includes a section of text with no formatting and the second snapshot 354 includes the same section of text in bold, then the word "bold" would be one example label 356 for the snapshot pair 360.

FIG. 4 is a flowchart depicting an exemplary log process 400 for storing prior versions of a data object, such as data object 310, in accordance with the principles of the present disclosure. The log process 400 begins at start module 402 and proceeds to receive operation 404. The receive operation 404 receives a command from a user to execute an editing operation to change the content 315 of a data object 310. A first record operation 406 copies the content 315 of the data object 310 into the history 330 of the data object 310 as a first snapshot 352.

An execute operation 408 performs the requested editing operation on the content 315. A second record operation 410 copies a state of the content 315 of the data object 310 into the history 330 as a second snapshot 354. For example, in an embodiment, the second record operation 410 copies information about the content 315 of the data object 310 The log process 400 completes and ends at stop module 412. The log process 400 begins again each time the user issues a command to execute an editing operation.

Figure 5:
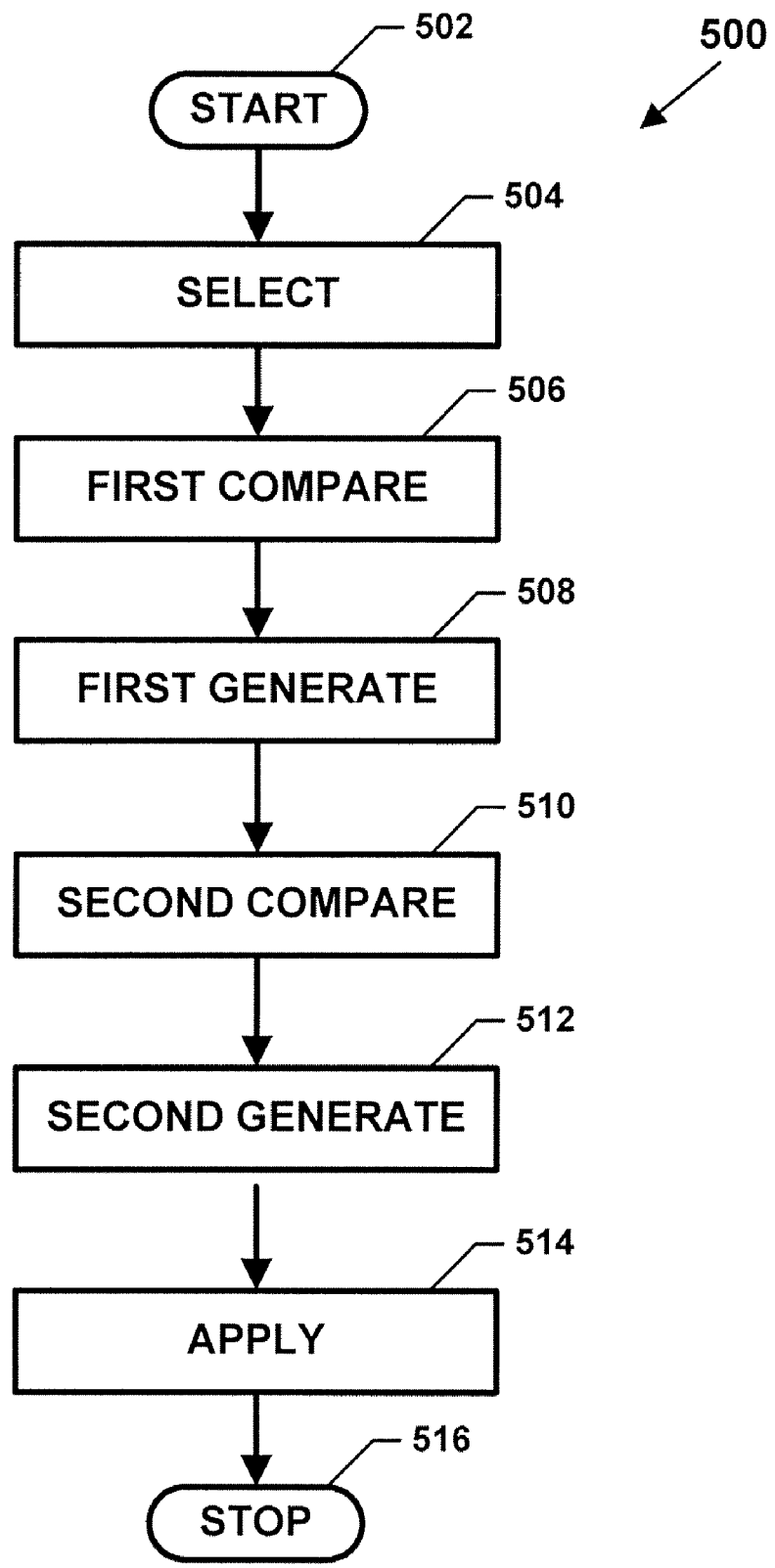
FIG. 5 illustrates an exemplary undo process for undoing the effects of an editing operation using a three-way merge algorithm.
Figure 6:
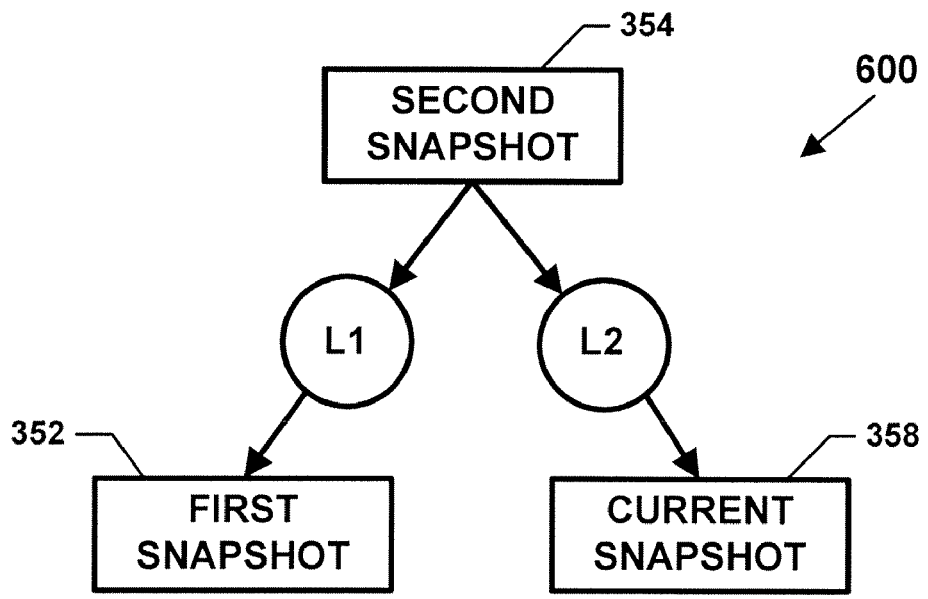
FIG. 6 is a block diagram showing the generation of first and second lists L1, L2 of editing operations to perform an undo process.

FIGS. 5 and 6 provide examples of select steps of the editing process 200 described in FIG. 2. FIG. 5 illustrates an exemplary undo process 500 for undoing the effects of an editing operation. In the example shown, the undo process 500 includes the execution of a three-way merge process. In general, a three-way merge algorithm is used to combine two subsequent states of the same document into one. In the arrangement shown, the three-way merge process can be used in shared environments to resolve conflicts among editing operations performed by different users to a shared data object and to logically apply the different editing operations to shared data object. In this manner, the original intent of the users that are editing the document can be preserved. Such three-way merge processes are known to those of skill in the art.

For example, in one embodiment of the three-way merge process, the process identifies a base document state from which two different current revision states of the document originated. The current revision states are compared to the base document state to identify a sequence of editing operations that transform the base document state into a logical combination of the current revision states.

In one example, this comparison is accomplished by "diffing," or comparing each revision state to the base document state to determine a set of operations that, if applied to the base state, would produce the respective current revision state. These operations typically have specific precedence and dependency requirements, referred to as a schedule. Once identified, the two schedules (corresponding to the two current revision states) are merged to create the desired document state.

Other techniques can be used to implement the three-way merge process. For example, in one alternative arrangement, journaling of the operations is used to record each operation as it occurs. The list of journaled operations can be used to recreate a previous document state.

The undo process 500 of FIG. 5 initializes and begins at start module 502 and proceeds to a select operation 504. The select operation 504 determines which snapshot pair 360 (FIG. 3) in the history 330 of the data object 110 corresponds with the editing operation to be undone. In an embodiment, the user selects a label 356 associated with the snapshot pair 360 representing the effects of the editing operation to be undone.

A first compare operation 506 determines the differences between the content 315 of the data object 310 as indicated in the second snapshot 354 of the selected pair 360 and the content 315 indicated in the first snapshot 352 of the selected pair 360. For example, the first compare operation 506 determines whether any content 315 has been added, deleted, or moved. The first compare operation 506 also determines whether any properties (e.g., formatting) associated with the content have changed.

A first generate operation 508 produces a list L1 (see FIG. 6) of one or more editing operations that, if applied to the content 315 of the second snapshot 354, would produce the state of the data object 310 shown in the first snapshot 352. For example, the first generate operation 508 can generate editing operations to add, delete or move content. The first generate operation 508 also can generate editing operations to change the properties of content.

A second compare operation 510 determines the differences between the content 315 of the data object 310 shown in the second snapshot 354 of the selected pair 360 and the current state 358 (FIG. 6) of the data object 310. A second generate operation 512 produces a list L2 (FIG. 6) of one or more editing operations that, if applied to the content 315 of the data object 310 shown in the second snapshot 354, would produce the current state 358 of the data object 310.

A merge operation 514 applies the editing operations of the first list L1 and the editing operations of the second list L2 to the data object content 315 stored in the second snapshot 354 of the selected pair 360 to produce a new state of the data object 310. Typically, the merge operation 514 removes duplicate editing operations and reconciles conflicting editing operations. The merge process 500 completes and ends at a stop module 516.

FIG. 6 illustrates a block diagram 600 showing the generation of the first and seconds lists L1, L2 of editing operations. The first list L1 includes editing operations which, if applied to the content 315 of the second snapshot 354, would produce the content 315 of the first snapshot 352. The second list L2 includes editing operations which, if applied to the content 315 of the second snapshot 354, would produce the content of the current state of the document (e.g., a snapshot taken immediately before execution of the undo operation) 358.

In some embodiments, the list L1 of editing operations will include a functional inverse (e.g., a logical reversal) of the editing operation to be undone. For example, if the editing operation to be undone includes the deletion of a sentence, then the list L1 of editing operations may include an editing operation to add the sentence to the content 315. In other embodiments, however, the list L1 will not include a functional inverse of the editing operation to be undone.

Figure 7:
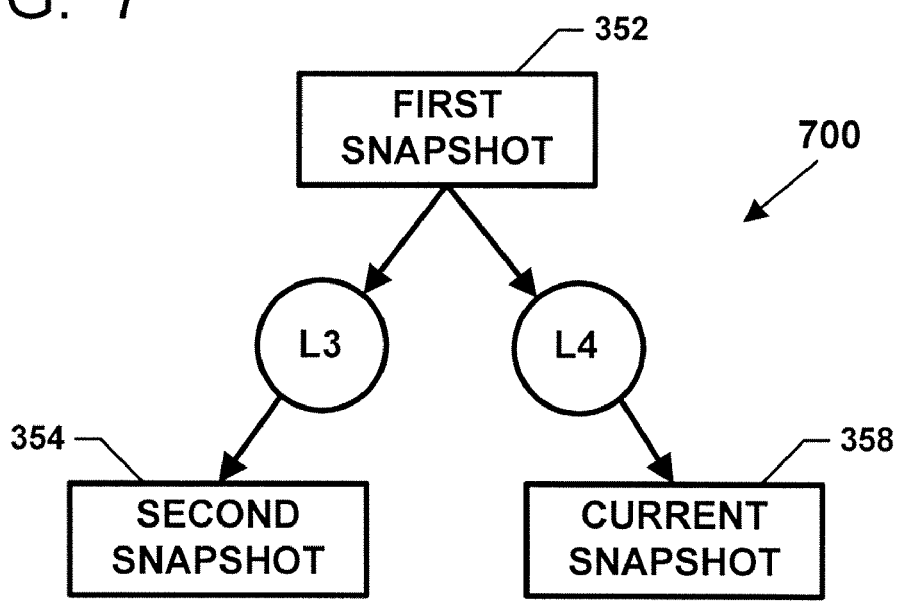
FIG. 7 is a block diagram showing the generation of third and fourth lists L3, L4 of editing operations to perform a redo process.

Referring to FIG. 7, the principles of the present disclosure provide for execution of a redo command to return a data object to the state of the data object prior to execution of an undo command (i.e., to undo an "undo command"). FIG. 7 illustrates a block diagram 700 depicting the relationship between the snapshots 352, 354 of the snapshot pair 360 associated with the editing operation to be redone and the current state 358 of the data object 310.

The redo operation includes generally the same steps as the undo operation, except the lists of editing operations are produced based on different comparisons among the states of the data object. For example, a list L3 of editing operations is generated to convert a data object 310 from the state indicated in the first snapshot 352 to the state indicated in the second snapshot 354. Another list L4 includes editing operations to convert the state of the data object 310 of the first snapshot 352 to the current state of the data object. To redo an undone editing operation, the editing operations from list L3 and the editing operations from list L4 are applied to the content 315 of the data object 310 indicated in the first snapshot 352.

Figure 8:
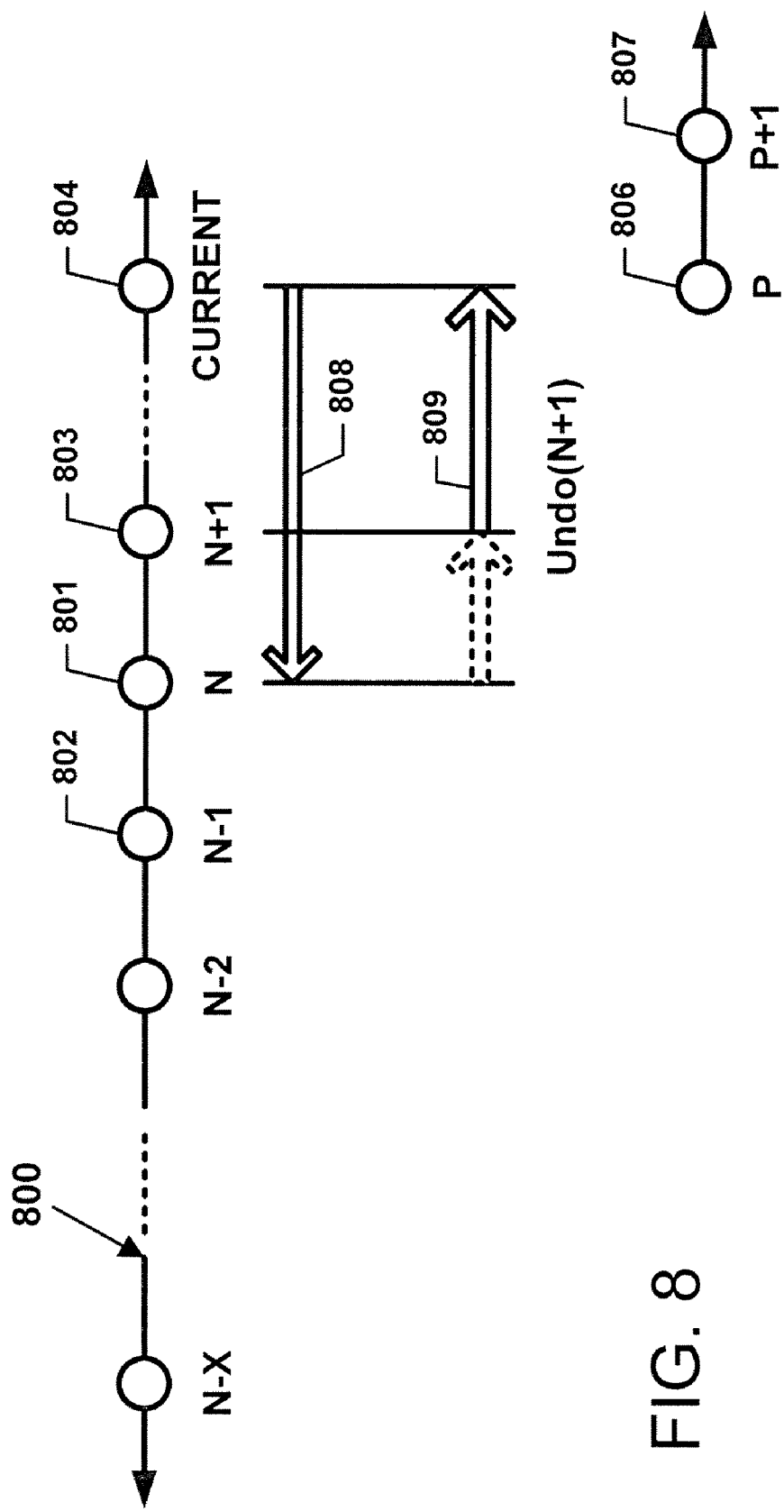
FIG. 8 illustrates a timeline indicating the states of a data object during an exemplary interactive editing process in which editing operations are applied to the data object and an undo process is applied in accordance with the principles of the present disclosure.
Figure 9:
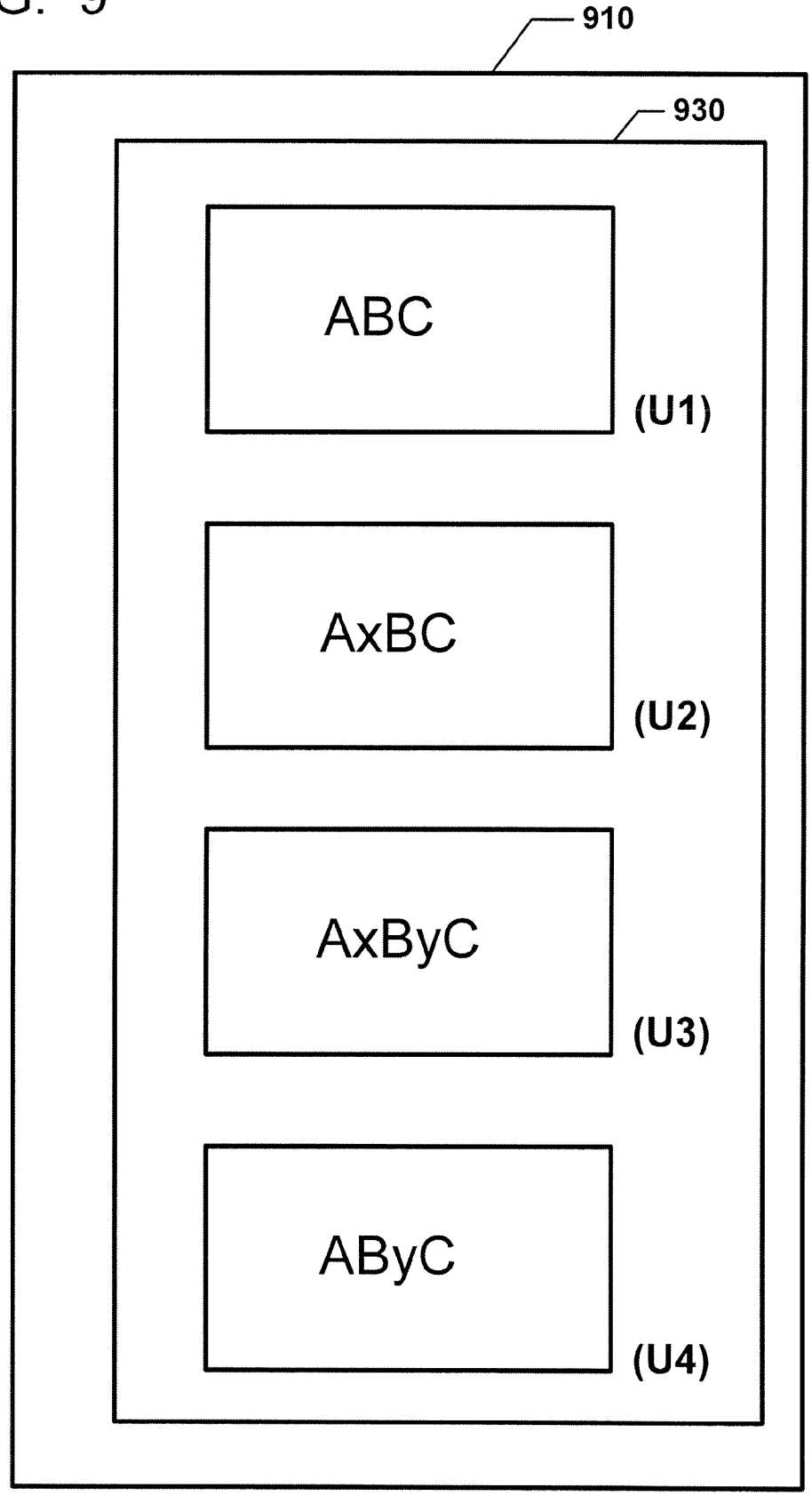
FIG. 9 illustrates document states U1-U4 stored in the history of an exemplary text document during an editing process.
Figure 10:
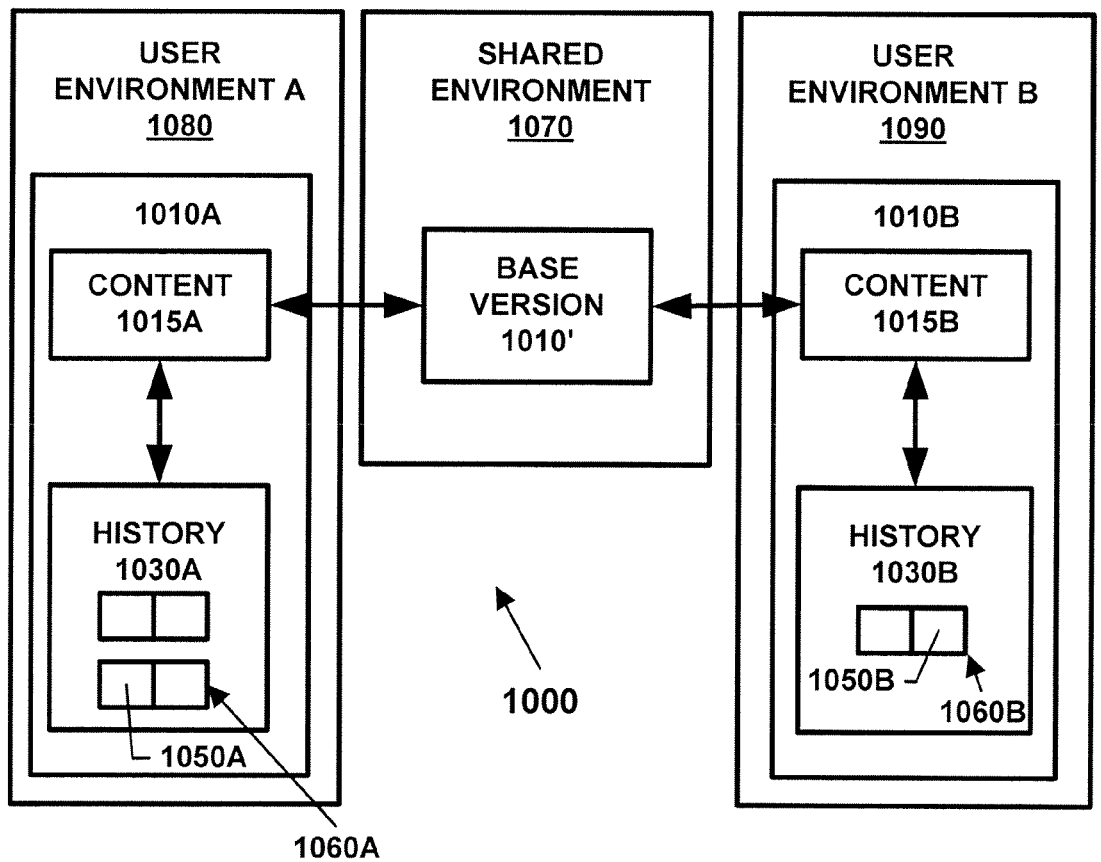
FIG. 10 is a block diagram showing an environment of a first user A and an environment of a second user B in which users A and B can edit a data object within a shared environment.

Referring to FIGS. 8-10, examples of the undo process executed in accordance with the principles of the present disclosure are shown. FIG. 8 illustrates a timeline 800 indicating the states of a data object, such as data object 310, during an exemplary interactive editing process in which a plurality of editing operations are applied to the data object. FIG. 8 illustrates the effects of an undo process executed in accordance with the principles of the present disclosure.

Each node 805 on the timeline 800 represents a version of the data object stored either immediately before or immediately after execution of the respective editing operation. In the timeline 800, a node 801 identifies one prior state N of the data object and a node 802 identifies a state N−1 of the data object prior to the state N. A node 803 identifies a state N+1 of the data object after an editing operation has been applied to the data object of state N. A node 804 identifies a current state of the data object after at least one additional editing operation has been performed on the data object of state N+1.

In a conventional undo process, when a user wishes to undo a particular editing operation, the data object is restored to a state occurring prior to the execution of the editing operation. For example, if the user wishes to undo the editing operation performed between data object state N and data object state N+1, then data object state N is restored (e.g., reloaded), thereby eliminating the effects of editing operations executed after state N (see arrow 808). After execution of the conventional undo process, editing operations can be performed on the data object of state N.

In contrast, an undo process performed according to the principles of the present disclosure does not cancel the effects of editing operations performed subsequent to the undone editing operation. Rather, when a user wishes to undo a particular editing operation, changes made to the data object subsequent to the execution of the editing operation are applied to the state of the data object occurring before the execution of the editing operation to produce a new document state.

For example, if the user wishes to undo the editing operation applied to data object state N (node 801) to produce data object state N+1 (node 803), then a comparison is made between a current state (node 804) of the data object and the prior state N+1 (node 803) to determine what editing operations can be applied to the data object of state N+1 (node 803) to produce the current state 804 of the data object (see arrow 809). These editing operations are then applied to the data object of state N (node 801) to produce a new state P (node 806) of the data object. A subsequent editing operation produces a states P+1 (node 807) of the data object.

The results of the undo processes reflected in timelines 800 can best be understood through an example application. FIG. 9 illustrates document states U1-U4 stored in the history 930 of an exemplary text document 910 during an editing process. The document 910 contains the letters ABC in a first document state U1. The letter x is added between letters A and B in a first editing operation resulting in document state U2, and the letter y is added between letters B and C in a third editing operation resulting in document state U3.

When a user wishes to undo the addition of the letter x, the document 910 is restored to a state of the document 910 existing prior to the addition of the letter x, for example, document state U1. Changes made to the document 910 between document state U2 and the current document state, in this case, document state U3, are applied to document state U1 to produce a new document state U4. In the example shown, the addition of the letter x has been undone, but the addition of the letter y remains to produce text string ABγC in document state U4. Subsequent editorial revisions are made to the document 910 based on the new document state U4.

Referring to FIGS. 10-17, the above described undo and redo processes can be implemented within a shared environment to enable users to "undo" their own editing operations without necessarily canceling the effects of intervening editing operations performed by others. FIG. 10 is a block diagram 1000 showing an environment 1080 of a first user A and an environment 1090 of a second user B. User A and user B can both edit a data object 1010 within a shared environment 1070. A base version (i.e., an official or master copy) 1010' of the data object 1010 is stored within the shared environment 1070.

Figure 11:
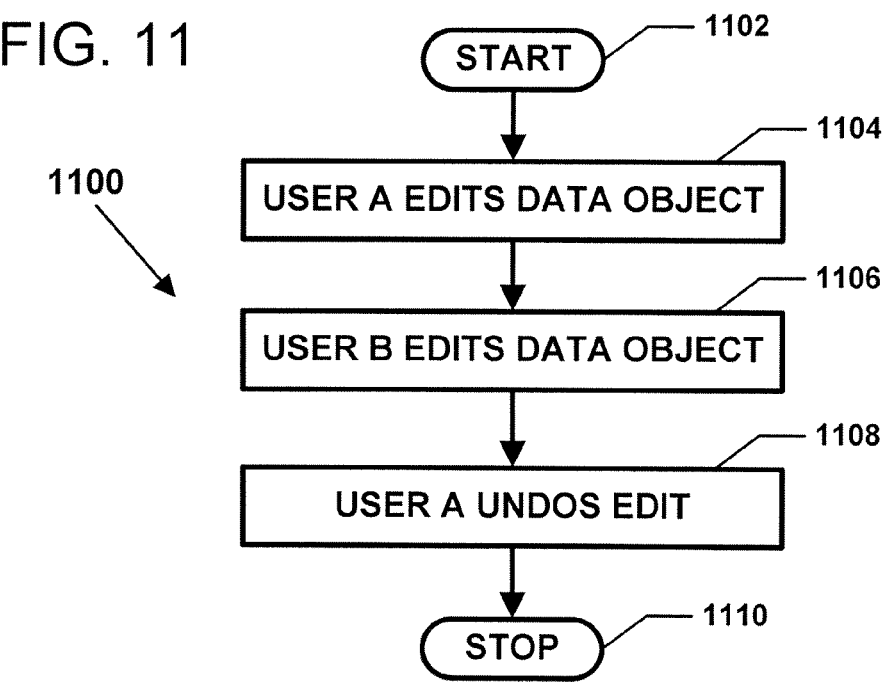
FIG. 11 is a flowchart illustrating an editing process for performing editing operations on a data object within a shared environment.

FIG. 11 is a flowchart depicting an editing process 1100 for performing editing operations on a data object, such as data object 1010, within a shared environment. The editing process 1100 begins at a start module 1102 and proceeds to a first edit operation 1104. User A executes one or more editing operations on the data object 1010 in the first edit operation 1104. User B executes one or more editing operations on the data object 1010 in the second edit operation 1106. The first and second edit operations 1104, 1106 can be performed sequentially, concurrently, or at any desired time in relation to one another.

At one point in time, user A decides to undo one or more select editing operations performed by user A on the data object 1010. As discussed in greater detail herein, undo operation 1108 removes the effects of the select editing operations to be undone from the data object 1010 without removing the effects of user B's editing operations. The editing process 1100 completes and ends at a stop module 1112.

Figure 12:
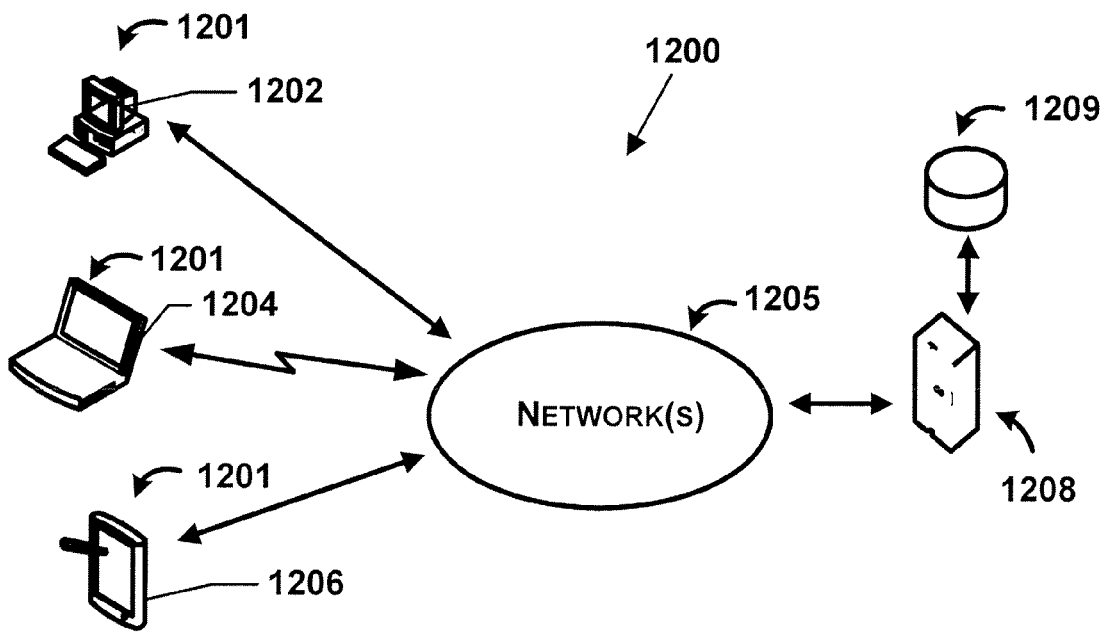
FIG. 12 illustrates a network system in which multiple computing devices can be communicatively coupled to shared computing device (e.g., a server) via a network to create and edit data objects in accordance with the principles of the present disclosure.
Figure 13:
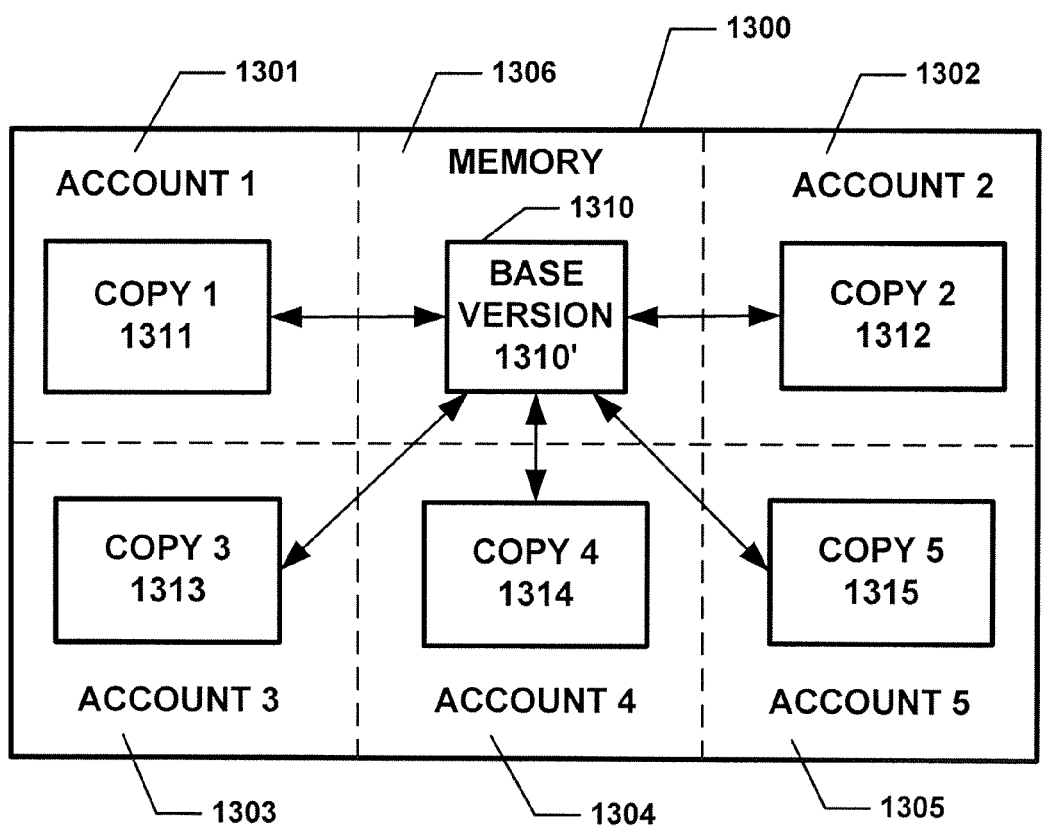
FIG. 13 is a block diagram illustrating an exemplary computing device maintaining a plurality of user accounts to create and edit data objects in accordance with the principles of the present disclosure.
Figure 14:
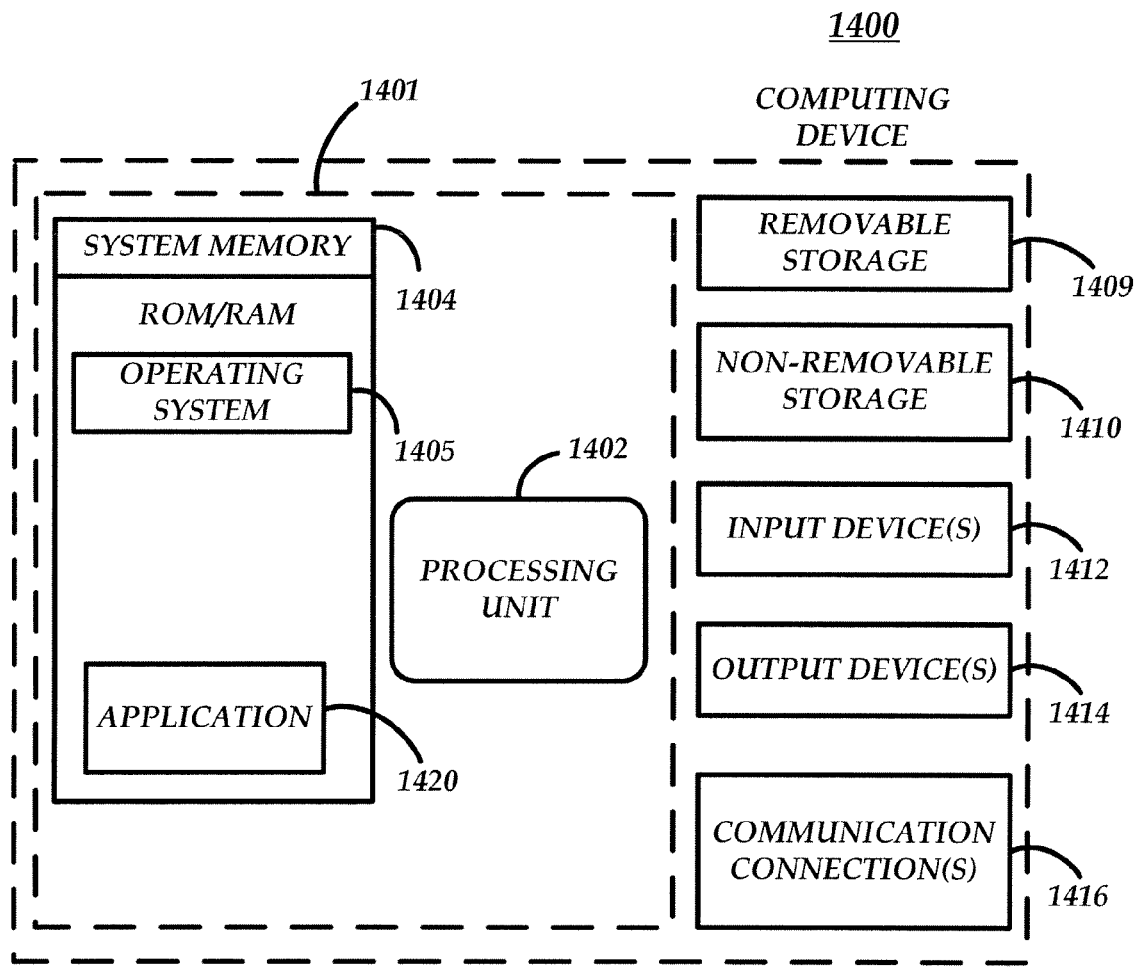
FIG. 14 illustrates one exemplary system for implementing the disclosure including a computing device.

FIGS. 12-14 illustrate example embodiments of systems in which users can share and edit data objects in a collaborative environment, such as that provided by the application ONENOTE® from MICROSOFT CORPORATION of Redmond, Wash. In an embodiment, each user can edit the user's own copy of the data object on the user's own computing device 1201. For example, FIG. 12 illustrates a network system 1200 in which multiple computing devices 1201 can be communicatively coupled to a shared computing device (e.g., a server) 1208 via a network 1205. Some non-limiting examples of computing devices 1201 can include personal computers 1202, notebook computers 1204, and PDA's 1206, servers, smart phones, tablet computers, etc. The shared computing device 1208 can include a memory 1209 in which a base version of each data object can be stored.

One non-limiting embodiment of a computing device, such as computing device 1201, is described herein with reference to FIG. 14. With reference to FIG. 14, one exemplary system for implementing the disclosure includes a computing device, such as computing device 1400. In a basic configuration, the computing device 1400 typically includes at least one processing unit 1402 for executing programs and system memory 1404.

Depending on the exact configuration and type of computing device 1400, the system memory 1404 may include, but is not limited to, RAM, ROM, EEPROM, flash memory, CD-ROM, digital versatile disks (DVD) or other optical storage, magnetic cassettes, magnetic tape, magnetic disk storage or other magnetic storage devices, or other memory technology. System memory 1404 typically includes an operating system 1405 suitable for controlling the operation of the computing device (e.g., a networked personal computer) 1400, such as the WINDOWS® operating systems from MICROSOFT CORPORATION of Redmond, Wash. The system memory 1404 also may include one or more software applications, such as client applications 1420, for creating and editing data objects. One non-limiting example of a client application 1420 suitable for editing data objects in accordance with the principles of the present disclosure is ONENOTE® from MICROSOFT CORPORATION of Redmond, Wash.

Computing device 1400 also may have input device(s) 1412 such as keyboard, mouse, pen, voice input device, touch input device, etc. for manipulating data objects. Output device(s) 1414 such as a display, speakers, printer, etc. also may be included. These devices are well known in the art and need not be discussed at length herein. The computing device 1400 may contain communication connections 1416 that allow the device to communicate with other computing devices, such as shared device 1208 (FIG. 12), for example, over a network in a distributed computing environment (e.g., an intranet or the Internet). By way of example, and not limitation, communication device media includes wired media such as a wired network or direct-wired connection, and wireless media such as acoustic, RF, infrared and other wireless media.

Alternatively, in another embodiment, multiple users can utilize the same computing device to simultaneously edit different copies of a data object. For example, FIG. 13 is a block diagram illustrating an exemplary computing device 1300 maintaining a plurality of user accounts 1301, 1302, 1303, 1304, 1305. Each user account 1301, 1302, 1303, 1304, 1305 can store a separate copy 1311, 1312, 1313, 1314, and 1315, respectively, of one or more data objects 1310. In an embodiment, a base version 1310' of the data object 1310 can be stored within a shared account 1306 on the computing device 1300. In other embodiments, however, the copy 1311, 1312, 1313, 1314, 1315 stored on one of the user accounts 1301, 1302, 1303, 1304, 1305 can be designated as the base version 1310'.

Figure 15:
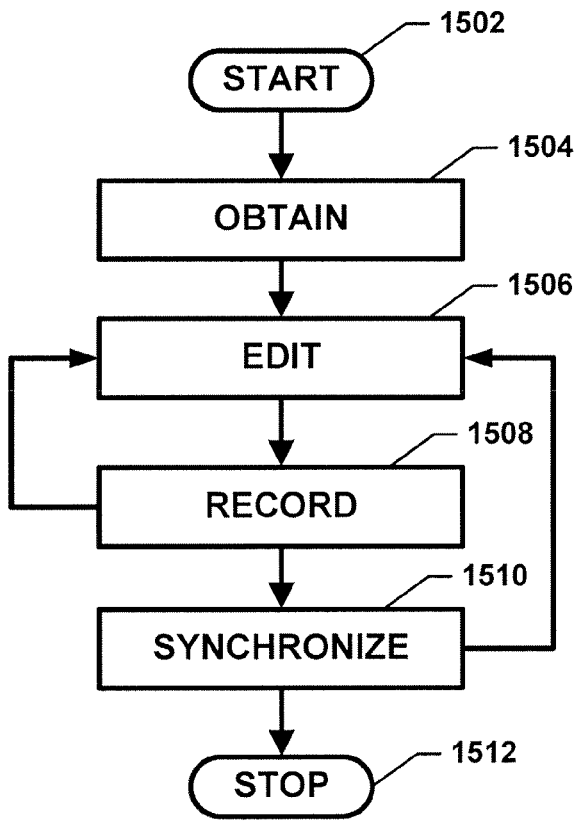
FIG. 15 is a flowchart illustrating a synchronization process for integrating revisions made to copies of the data object with the base version in accordance with the principles of the present disclosure.
Figure 16:
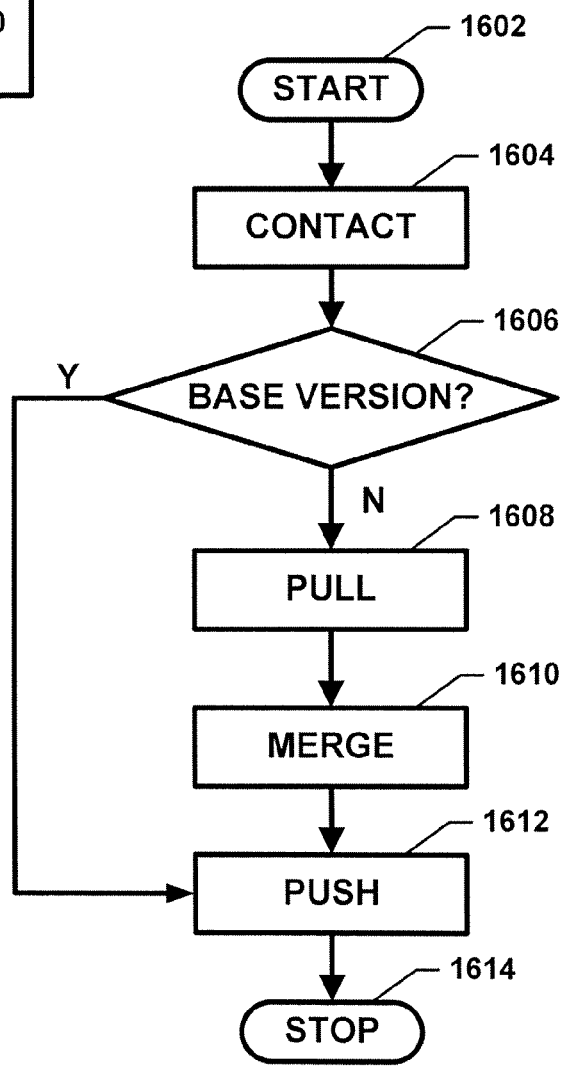
FIG. 16 is a flowchart illustrating a sharing process for editing copies of a data object within a shared environment in accordance with the principles of the present disclosure.
Figure 17:
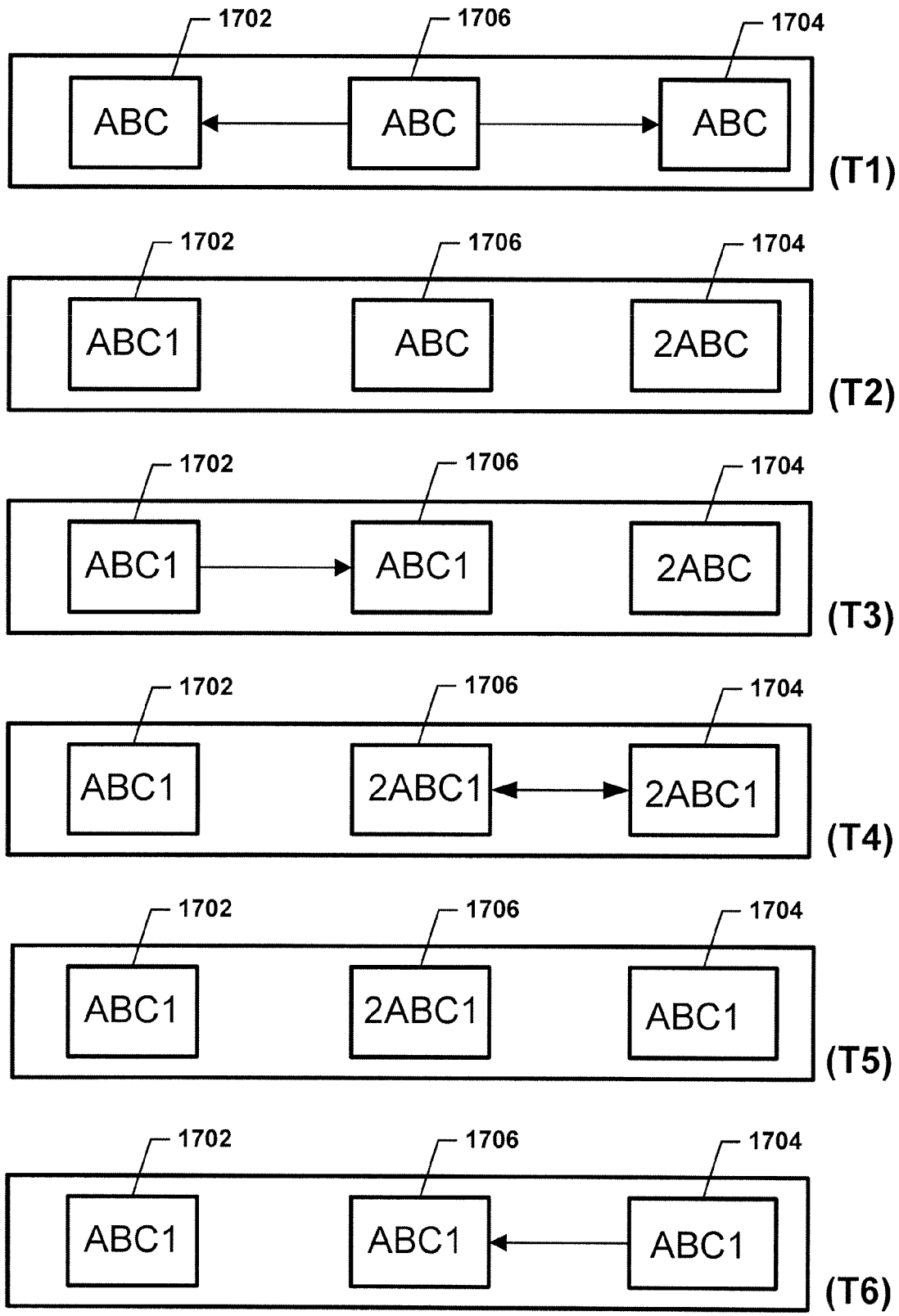
FIG. 17 illustrates the results of the principles of the present disclosure being applied to edit a text document within a shared environment.

Referring to FIGS. 15-17, in use, users A and B each access and edit a data object, such as data object 1010 (FIG. 10), using a sharing process, for example, sharing process 1500 shown in FIG. 15. The exemplary sharing process 1500 initializes and begins at a start module 1502 and proceeds to an obtain operation 1504.

The obtain operation 1504 enables each user A, B to obtain a separate copy 1010A, 1010B of the base version 1010' of the data object 1010 (FIG. 10). For example, each user can download a copy of the base version 1010' to a separate computing device. User B can obtain a copy 1010B of the base version 1010' regardless of whether user A has already obtained and revised a copy 1010B of the base version 1010'. Each user's copy 1010A, 1010B includes a content 1015A, 1015B, respectively, and an undo stack 1030A, 1030B logging the changes made to the content 1015A, 1015B of the data object 1010A, 1010B by each user A, B.

An edit operation 1506 performs editing operations requested by each user A, B on the user's copy 1010A, 1010B of the data object 1010. For example, edit operation 1506 applies editing operations requested by user A to the content 1015A of user A's copy 1010A. The editing operations change the state of the content 1015A of user A's copy 1010A. A record operation 1508 creates a snapshot of each state of the content 1015A before and/or after an editing operation is applied. For example, snapshots 1050A contained within the history 1030A of user A represent states of the data object 1010 before and/or after execution of editing operations requested by user A.

Sharing process 1500 cycles between edit operation 1506 and record operation 1508 until one of the users A, B submits revisions in a synchronize operation 1510. Synchronize operation 1510 merges the revised copy 1010A, 1010B made by one of the users A, B with the base version 1010' of the data object 1010. Sharing process 1500 completes and ends at stop module 1512. Alternatively, one of the users, such as user A, can edit the base version 1010' of the data object 1010 and user B can edit a copy 1010B of the data object 1010.

FIG. 16 is a flowchart illustrating a synchronization process 1600 for integrating revisions made to the copies 1010A, 1010B of the data object 1010 by users A, B with the base version 1010'. For illustrative purposes, the synchronization process 1600 will be described as being performed by a user A. However, each of the users A, B editing the data object can perform the synchronization process 1600 when the changes executed by the respective user A, B are submitted.

The synchronization process 1600 begins at a start module 1602 and proceeds to a contact operation 1604. The contact operation 1604 establishes communicative contact between the environment 1080 (FIG. 10) in which user A is working and the environment 1070 in which the base version 1010' of the data object 1010 is stored. For example, contact operation 1604 can provide communicative contact between a networked personal computer 1202 and a networked server 1208. The contact operation 1604 also can place a write-lock on the base version 1010' of the data object 1010 so that only one user A, B can update the base version 1010' at any given time.

A determination module 1606 determines whether the revised data object 1010A edited by user A was copied from the base version 1010' stored in the shared environment 1070. For example, the determination module 1606 can compare the time of creation of the data object from which copy 1010A was copied with the time of creation of the base version 1010'.

If revised data object 1010A was copied from the base version 1010' currently stored in the shared environment 1070, then synchronization process 1600 proceeds to a push operation 1612. For example, push operation 1612 is executed after determine module 1606 when the base version 1010' has not been updated since user A obtained user A's copy 1010A of the data object 1010. Push operation 1612 can save the revised data object 1010A to the shared environment 1070 as the new base version 1010'. Alternatively, push operation 1612 can edit the base version 1010' to incorporate the revisions of data object 1010A.

If revised data object 1010A was not copied from the base version 1010' currently stored within the shared environment 1070, however, then synchronization process 1600 proceeds to a pull operation 1608. For example, pull operation 1608 is executed when the base version 1010' is updated by another user (e.g., user B) after user A obtained the copy 1010A of the data object 1010. Pull operation 1608 obtains a copy of the base version 1010' currently stored within the shared environment 1070.

A merge operation 1610 performs a three-way merge between the current state of the revised data object 1010A, the base version 1010' of the data object 1010, and the original state of revised data object 1010A (e.g., the first snapshot in the history 1030 of the data object 1010A). For example, the merge operation 1610 can generate a list of editing operations that, if applied to the original state of the revised data object 1010A would produce the current state of the base version 1010'. In an embodiment, the merge operation 1610 applies these editing operations to the current version of the revised data object 1010A. In another embodiment, the merge operation 1610 also determines a list of editing operations that, if applied to the original state of the revised data object 1010A, would produce the current state of the revised data object 1010A. In such an embodiment, the merge operation 1610 applies the editing operations of both lists to the original state of the revised data object 1010A to produce a new state of revised data object 1010A.

The process 1600 then proceeds to the push operation 1612 described above to store the new state of the revised data object 1010A as the base version 1010'. The synchronization process 1600 completes and ends at a stop module 1614. In general, the synchronization process 1600 is repeated each time a user A, B submits revisions made to the data object 1010. In an embodiment, each revised copy 1010A, 1010B is automatically submitted at predetermined time intervals. In another embodiment, a revised copy 1010A, 1010B is submitted when the respective user A, B initiates contact with the shared environment 1070. In other embodiments, revisions are submitted at any desired time.

The principles disclosed above can be used to enable each user A, B to undo changes without undoing the changes of the other user. As noted above, each user A, B has a copy 1010A, 1010B of a data object including a history 1030A, 1030B of the data object 1010A, 1010B, respectively. The history 1030A, 1030B includes one or more snapshot pairs 1060A, 1060B, which indicate changes (i.e., one or more editing operations) made by each user A, B. The specific changes made by each user, therefore, can be determined and separated out from the changes made by other users.

These principles can be understood best through an example application. FIG. 17 illustrates at various time intervals the changes in content state of an exemplary text document being concurrently edited within a shared environment by a first and second user. The first and second users each obtain a copy 1702, 1704, respectively, of the base version 1706 of the text document (step 1504 of FIG. 15). In the example shown, at a first time T1, the base version 1706 of the text document and both copies 1702, 1704 contain the content ABC.

The users edit their own copies 1702, 1704 of the text documents (step 1506) to produce new document states. For example, at a time T2, the first user's copy 1702 contains the text ABC1 and the second user's copy 1704 of the text document contains the text 2ABC, although other editing operations can be applied to either copy 1702, 1704. Each user stores snapshots of the states of the user's document 1702, 1704 throughout the editing process. Because neither user has synchronized changes yet, the base version 1706 remains unchanged.

At a time T3, the first user synchronizes changes to the copy 1702 with the base version 1706 of the text document (step 1508) including accessing the shared environment (step 1604 of FIG. 16). The first user compares the original state of the copy 1702 of the text document to the base version 1706 (step 1606), although the computing device implementing the shared environment also can perform the comparison. In the example shown, the base version 1706 has not been updated since the first user obtained the copy 1702, so the first user's copy 1702 of the text document including the text ABC1 becomes the new base version 1706.

At a time T4, the second user synchronizes changes to the copy 1704 of the text document with the base version 1706. In the example shown, the base version 1706 has already been updated by the first user. The second user obtains a copy of the base version 1706, merges the edits made by the first user (e.g., the addition of the number 1) into the second user's copy 1704, and pushes the second user's copy 1704 onto the shared environment to become the new base version 1706. The second user's copy 1704 and the base version 1706 of the text document at time T4 contain the text 2ABC1.

At a time T5, the second user chooses to undo the addition of the number 2 before the text string ABC in the second user's copy 1704 of the text document. For example, the second user can execute the undo process 500 disclosed above with reference to FIG. 5. The second user selects a snapshot pair associated with the addition of the number 2 (step 504) and compares a snapshot taken of the content of the second user's copy 1704 after the number 2 was added with a snapshot taken of the content of the copy 1704 before the number 2 was added (step 506).

One or more editing operations are identified for transforming the content of the second snapshot to the content of the first snapshot (step 508). In the example shown, an editing operation resulting in the deletion of the number 2 is identified. In an embodiment, the identified editing operations are applied to the current version of the second user's copy 1704 of the text document. Because the editing operations are specifically tailored to undo the second user's editing operation, e.g., to delete the number 2, the addition of the number 1 to the text document by the first user remains unchanged.

In another embodiment, the second user also compares the content of the second snapshot with the content of the current copy 1704 of the text document (step 510). In the example shown, one or more editing operations are identified for transforming the content of the second snapshot to the content of the current copy 1704. These editing operations can be applied to the content of the second snapshot to produce a new document state containing the effects of editing operations performed prior and subsequent to the editing operation to be undone, but not containing the effects of the editing operation to be undone.

At a time T6, the second user again synchronizes changes to the copy 1704 of the text document with the base version 1706. Because the base version 1706 has not been updated since the second user last synchronized, the second user's copy 1704 of the text document becomes the new base version 1706.

Embodiments of the disclosure may be implemented as a computer process (method), a computing system, or as an article of manufacture, such as a computer program product or computer readable media. The methods can be implemented in any number of ways, including the structures described in this document. One such way is by machine operations, of devices of the type described in this document. Another optional way is for one or more of the individual operations of the methods to be performed in conjunction with one or more human operators performing some. These human operators need not be collocated with each other, but each can be only with a machine that performs a portion of the program.

The computer program product may be a computer storage media readable by a computer system and encoding a computer program of instructions for executing a computer process. The computer program product may also be a propagated signal on a carrier readable by a computing system and encoding a computer program of instructions for executing a computer process. The term computer readable media as used herein includes both storage media and communication media.

Those skilled in the art will appreciate that the disclosure may be practiced with other computer system configurations, including hand-held devices, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote memory storage devices. Generally, program modules include routines, programs, components, data structures, and other types of structures that perform particular tasks or implement particular abstract data types.

In view of the foregoing, it can be appreciated that the present disclosure provides a method and system for undoing and redoing multiple editing operations that can be advantageously used for undoing non-invertible editing operations and/or for unsequentially undoing editing operations. In a preferred embodiment, a method is provided to manage the stored prior states such that the undo and redo commands can be implemented in a shared environment.

The invention claimed is:

1. A method of undoing editing operations performed on a data object, comprising:
   storing a plurality of prior states of the data object, each prior state corresponding to previously performed editing operations on the data object;
   receiving an instruction to undo an effect of an undesired editing operation performed on the data object;
   selecting a first stored prior state of the data object, the first stored prior state having been stored before performance of the undesired editing operation;
   selecting a second stored prior state of the data object, the second stored prior state having been stored after performance of the undesired editing operation;
   comparing the second stored prior state of the data object with the first stored prior state to determine the effect of the undesired editing operation; and
   applying the effect of the undesired editing operation to a current state of the data object to obtain a new state of the data object, the new state of the data object not including the effect of the undesired editing operation;
   receiving a request to perform a first editing operation;
   taking a first snapshot of the data object;
   executing the first editing operation;
   taking a second snapshot of the data object;
   associating the first snapshot and the second snapshot together to form a snapshot pair; and
   generating a label to describe a difference between the first snapshot and the second snapshot and associating the label with the snapshot pair.

2. The method of claim 1, further comprising:
   storing the current state of the data object prior to applying a next editing operation to the data object; and
   applying the next editing operation to the data object.

3. The method of claim 1, wherein the data object is a document editor.

4. The method of claim 1, wherein the differences between the stored prior state of the data object and the current state of the data object include effects of editing operations performed subsequently to performance of the editing operation.

5. The method of claim 4, wherein selecting the first stored prior state of the data object comprises:
   determining which of a plurality of snapshot pairs corresponds to the editing operation; and
   selecting the corresponding snapshot pair.

6. The method of claim 1, wherein comparing the second stored prior state of the data object with the first stored prior state to determine the effect of the editing operation further comprises using a three-way merge process to conduct the comparing.

7. A method of undoing editing operations performed on a data object, comprising:
   storing a plurality of prior states of the data object, each prior state corresponding to previously performed editing operations on the data object;
   receiving an instruction to undo an effect of an undesired editing operation performed on the data object;
   selecting a first stored prior state of the data object, the first stored prior state having been stored before performance of the undesired editing operation;
   selecting a second stored prior state of the data object, the second stored prior state having been stored after performance of the undesired editing operation;
   comparing the second stored prior state of the data object with the first stored prior state to determine the effect of the undesired editing operation;
   applying the effect of the undesired editing operation to a current state of the data object to obtain a new state of the data object, the new state of the data object not including the effect of the undesired editing operation;
   receiving a request to perform a first editing operation;
   taking a first snapshot of the data object;
   executing the first editing operation;
   taking a second snapshot of the data object;
   associating the first snapshot and the second snapshot together to form a snapshot pair; and
   generating a label to describe a difference between the first snapshot and the second snapshot and associating the label with the snapshot pair, including:
   determining the difference between the first snapshot and the second snapshot;
   identifying one or more editing operations to transform the first snapshot to the second snapshot; and
   creating the label based on the editing operations.

* * * * *